(12) United States Patent
Geskes (10) Patent No.: US 9,791,214 B2
(45) Date of Patent: Oct. 17, 2017

(54) EXHAUST GAS HEAT EXCHANGER

(71) Applicant: MAHLE International GmbH, Stuttgart (DE)

(72) Inventor: Peter Geskes, Ostfildern (DE)

(73) Assignee: MAHLE International GmbH, Stuttgart (DE)

( * ) Notice: Subject to any disclaimer, the term of this patent is extended or adjusted under 35 U.S.C. 154(b) by 412 days.

(21) Appl. No.: 14/541,699

(22) Filed: Nov. 14, 2014

(65) Prior Publication Data

US 2015/0068716 A1 Mar. 12, 2015

Related U.S. Application Data

(63) Continuation of application No. PCT/EP2013/059897, filed on May 14, 2013.

(30) Foreign Application Priority Data

May 15, 2012 (DE) .................. 10 2012 208 100

(51) Int. Cl.
*F28D 7/10* (2006.01)
*F28F 19/00* (2006.01)
(Continued)

(52) U.S. Cl.
CPC .............. *F28D 7/10* (2013.01); *F01N 3/005* (2013.01); *F02M 26/32* (2016.02); *F02M 26/35* (2016.02);
(Continued)

(58) Field of Classification Search
CPC ...... F28F 19/002; F28F 9/0229; F28F 17/005; F22B 37/08
(Continued)

(56) References Cited

U.S. PATENT DOCUMENTS 3,262,489 A 7/1966 Fritzberg
3,374,832 A 3/1968 Tucker
(Continued)

FOREIGN PATENT DOCUMENTS

AT 287 030 B 1/1971
CN 202039976 U 11/2011
(Continued)

OTHER PUBLICATIONS

Bourgoin, FR2925351 MT (English Translation), Jun. 2009.*
Abe, JP58160798MT (English Translation), Sep. 1983.*

*Primary Examiner* — Justin Jonaitis
*Assistant Examiner* — Eric Ruppert
(74) *Attorney, Agent, or Firm* — Muncy, Geissler, Olds & Lowe, P.C.

(57) ABSTRACT

An exhaust gas heat exchanger, in particular for use in a motor vehicle, having at least one first flow channel that conducts a first fluid, which first flow channel is accommodated in respective tube sheets at end areas of the first flow channel. A housing surrounds the first flow channel and forms a second flow channel for a second fluid that flows through the housing and flows around the first flow channel. Pipe sheets are inserted into the housing such that the first flow channel is sealed off from the second flow channel. A first diffuser conducts the first fluid into the first flow channel and a second diffuser conducts the first fluid out of the first flow channel. A first shielding element has a first passage and a first spacing element is placed onto a tube sheet from the side facing away from the first flow channel.

10 Claims, 4 Drawing Sheets

(51) Int. Cl.
*F28F 9/02* (2006.01)
*F01N 3/00* (2006.01)
*F28F 17/00* (2006.01)
*F28D 7/16* (2006.01)
*F28D 21/00* (2006.01)
*F02M 26/32* (2016.01)
*F02M 26/35* (2016.01)

(52) U.S. Cl.
CPC ............ *F28D 7/16* (2013.01); *F28D 21/0003* (2013.01); *F28F 9/0229* (2013.01); *F28F 17/005* (2013.01); *F28F 19/002* (2013.01); *F01N 2240/02* (2013.01); *F28F 2265/02* (2013.01); *F28F 2265/10* (2013.01); *Y02T 10/20* (2013.01)

(58) Field of Classification Search
USPC ....................................................... 165/134.1
See application file for complete search history.

(56) References Cited

U.S. PATENT DOCUMENTS

| | | | |
|---|---|---|---|
| 3,451,472 A * | 6/1969 | Keck | F28D 7/06 165/134.1 |
| 3,504,739 A | 4/1970 | Pearce | |
| 3,568,764 A * | 3/1971 | Newman | F28D 7/06 165/134.1 |
| 4,083,707 A * | 4/1978 | Bivins, Jr. | B01D 1/06 122/32 |
| 4,173,615 A * | 11/1979 | Otsuka | B01J 10/02 165/134.1 |
| 4,254,819 A * | 3/1981 | Worrell | F28F 19/002 165/134.1 |
| 8,091,354 B2 | 1/2012 | Cremeens et al. | |
| 2004/0079079 A1 | 4/2004 | Martin et al. | |
| 2008/0135452 A1* | 6/2008 | Bandali | C10G 9/002 208/132 |

FOREIGN PATENT DOCUMENTS

| | | |
|---|---|---|
| DE | 81 21 511 U1 | 11/1981 |
| DE | 38 06 117 A1 | 9/1989 |
| DE | 10 2006 059 291 A1 | 6/2007 |
| DE | 10 2007 011 184 A1 | 9/2008 |
| DE | 11 2009 000 763 T5 | 3/2011 |
| DE | 10 2008 022 279 B4 | 6/2011 |
| EP | 0 070 371 A1 | 1/1983 |
| EP | 1 798 511 A1 | 6/2007 |
| FR | 2 925 351 A1 | 6/2009 |
| FR | 2925351 * | 6/2009 |
| GB | 1 212 526 | 11/1970 |
| JP | 58160798 * | 9/1983 |
| RU | 2 140 608 C1 | 10/1999 |

* cited by examiner

Fig. 4

EXHAUST GAS HEAT EXCHANGER

This nonprovisional application is a continuation of International Application No. PCT/EP2013/059897, which was filed on May 14, 2013, and which claims priority to German Patent Application No. DE 10 2012 208 100.3, which was filed in Germany on May 15, 2012, and which are both herein incorporated by reference.

BACKGROUND OF THE INVENTION

Field of the Invention

The present invention relates to an exhaust gas heat exchanger, particularly for use in a motor vehicle, having at least one first flow channel conducting a first fluid, which is taken up in its end regions in each case in a tube sheet, having a housing, which surrounds the first flow channel, whereby the housing has an inlet opening and an outlet opening and forms a second flow channel for a second fluid, whereby a second fluid is able to flow through the housing and the second fluid is able to flow around the first flow channel, the tube sheets are inserted in the housing such that the first flow channel is sealed off from the second flow channel, having a first diffuser, which conducts the first fluid into the first flow channel, and a second diffuser, which conducts the first fluid out of the first flow channel.

Description of the Background Art

Exhaust gas heat exchangers are used in motor vehicles today to reduce the exhaust gas temperature and thereby to greatly prevent nitrogen oxide and particulate emissions. In this regard, part of the exhaust gas is branched off downstream of the internal combustion engine and then passed through a suitable exhaust gas heat exchanger.

The cooled exhaust gas is then combined with fresh air drawn in by the internal combustion engine and again supplied to the internal combustion engine. Temperatures of up to 700° Celsius occur at the inlet of the exhaust gas heat exchanger.

Exhaust gas heat exchangers are known, for instance, from DE 10 2007 011 184 A1, that include exhaust gas-conducting tubes that are inserted on both sides into plates and are connected to these, for instance, by soldering or welding and the tubes are surrounded by a housing. The exhaust gas is thereby passed into the tubes via diffusers connected to the plates. In so doing, a coolant flows through the housing, as a result of which the coolant flows around the exhaust gas-conducting tubes.

A heat transfer occurs between the exhaust gas in the tubes and the coolant flowing around the tubes, as a result of which the exhaust gas is cooled.

A disadvantage of the prior art is that sometimes boiling processes in the coolant occur in exhaust gas heat exchangers of the described type. This adversely impacts the service life of the exhaust gas heat exchanger per se and can have a negative effect on the chemical composition of the coolant. Boiling processes can occur in particular in the inlet region, because here the hot exhaust gas directly strikes the plate of the exhaust gas heat exchanger and the plate of the exhaust gas heat exchanger is in direct contact with the coolant.

Furthermore, condensation of the exhaust gas can occur on the exit side of the exhaust gas heat exchanger. The condensing condensate can enter the combustion chamber with the exhaust gas returned to the internal combustion engine and there lead to increased corrosion and further damage to individual components.

SUMMARY OF THE INVENTION

It is therefore an object of the present invention to provide an exhaust gas heat exchanger in which no boiling processes occur and furthermore the formation or the conducting of condensate from the outlet side of the exhaust gas heat exchanger into the intake area of the internal combustion engine is ruled out.

In an embodiment, an exhaust gas heat exchanger, particularly for use in a motor vehicle, includes at least one first flow channel conducting a first fluid, which is taken up in its end regions in a tube sheet, having a housing, which surrounds the first flow channel, whereby the housing has an inlet opening and an outlet opening and forms a second flow channel for a second fluid, whereby a second fluid is able to flow through the housing and the second fluid is able to flow around the first flow channel, whereby the tube sheets are inserted in the housing such that the first flow channel is sealed off from the second flow channel, having a first diffuser, which conducts the first fluid into the first flow channel, and a second diffuser, which conducts the first fluid out of the first flow channel, whereby the exhaust gas heat exchanger has at least one first shielding element, which has at least one first passage, and at least one first spacing element, which is placed on a tube sheet from the side facing away from the first flow channel.

This is particularly advantageous, because the shielding element forms a thermal spacing between the first fluid through the heat exchanger and the tube sheet and the first flow channels. As a result, the heating of the heat exchanger is positively influenced.

It is also advantageous if the passage projects into a first flow channel. As a result, the fluid flowing through the shielding element is conveyed directly into the first flow channels. Direct contact between the throughflowing fluid and the tube sheet does not occur thereby.

In an embodiment, the outer contour of the passage can substantially coincides with the inner contour of the first flow channel.

This is advantageous in order to be able to position the shielding element on the tube sheet such that the passages can project into the first flow channels to be able to convey the fluid directly into the interior of the first flow channels.

The outer cross section of the passage can be smaller than the inner cross section of the first flow channel.

It is advantageous, furthermore, if the outer contour of the passage does not contact the inner contour of the first flow channel.

Because of the smaller outer cross section of the passage in comparison with the inner cross section of the flow channel, the passage can be spaced apart from the flow channel such that both are not in direct contact, which is beneficial for the thermal isolation.

It is also expedient, if the spacing element spaces apart the first shielding element relative to the tube sheet. In this way, the thermal isolation between the tube sheet and the shielding element is also increased, which contributes overall to an advantageous temperature distribution in the heat exchanger.

It is advantageous, furthermore, if the first shielding element has an at least partially circumferential upstanding edge region, with which the shielding element is supported on the first diffuser.

This is used particularly for the permanent positioning of the shielding element in the interior of the heat exchanger.

It is also expedient, if a second shielding element is fixedly connected to the second diffuser at least at one location.

The thermal isolation effect of the shielding element can be achieved on both sides of the heat exchanger by the arrangement of a second shielding element particularly in the second diffuser. The arrangement of a second shielding element on the second side of the heat exchanger can be additionally advantageous for the separation of condensation water that forms within the scope of cooling of the fluid flowing through the heat exchanger.

In an embodiment, the second diffuser can have in a side wall a first opening, which is arranged between the inlet opening, facing the housing, of the second diffuser and the connecting site of the second shielding element to the second diffuser.

The condensation water already mentioned above, which condenses on the walls of the first flow channels and runs through the air gap between the second shielding element and the first flow channels out of the first flow channels, can be conducted out of the heat exchanger through this opening in the diffuser and thus removed from the fluid flow of the first fluid.

It is also expedient, if the second diffuser has a water separator placed downstream of the second shielding element in the flow direction of the first fluid.

The water separator can also filter out moisture that flows with the first fluid through the heat exchanger out of the fluid flow. As a result, advantageous fluid properties are achieved, particularly if the first fluid is an exhaust gas, which is again supplied to an internal combustion engine at least in part after flowing through the heat exchanger.

In an embodiment, the second shielding element in the at least partially upstanding edge region can have a second opening, which is arranged between the downstream water separator and the inlet opening, facing the housing, of the second diffuser.

The condensation water condensing on the water separator can be advantageously removed from the heat exchanger through an opening thus arranged.

An exhaust gas heat exchanger, according to an embodiment, can include a plurality of first flow channels, having a first shielding element and a second shielding element, which quantitatively have a number of passages, corresponding to the plurality of the first flow channels, and a plurality of spacing elements, whereby in each case a shielding element is placed on one of the tube sheets from the side facing away from the housing.

An embodiment of an exhaust gas heat exchanger in this form is particularly advantageous for use in the exhaust gas line of a motor vehicle. Thermal isolation of the tube sheet and the first flow channels is advantageously achieved by the first shielding element on the inflow side of the heat exchanger, and the generated condensation water is advantageously removed from the fluid flow by the second shielding element on the outflow side of the heat exchanger.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
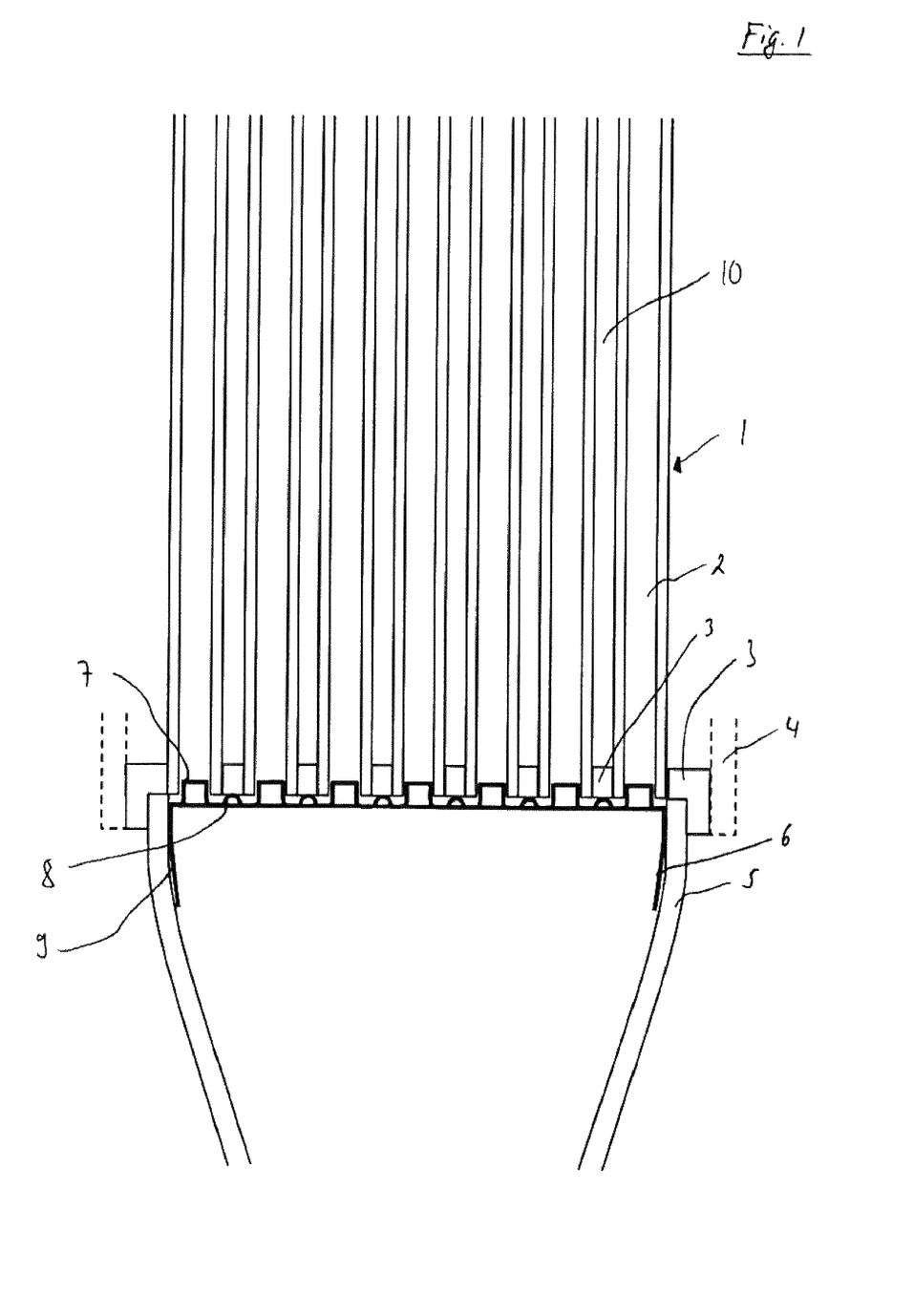
FIG. 1 shows a sectional cut through a shell and tube heat exchanger of the invention with an additionally inserted shielding element.

FIG. 1 shows a sectional cut through an exhaust gas heat exchanger 1. Exhaust gas heat exchanger 1 includes a plurality of flow channels 2 through which a fluid, in this case an exhaust gas, flows.

Flow channels 2 are taken up at their ends in tube sheets 3. Flow channels 2 taken up in tube sheets 3 are surrounded by a housing 4 in such a way that housing 4 with tube sheets 3 produces a tight connection, which separates flow channels 2 from a flow channel 10 in the interior of the housing.

Housing 4 has an inlet opening and outlet opening, not shown in FIG. 1, as a result of which a second fluid can flow through housing 4. A flow thereby flows around flow channels 2 conducting the first fluid. The heat transfer occurs between the first fluid, which flows within flow channels 2, and the second fluid, which flows through housing 4 and thereby in flow channel 10 around flow channels 2.

A diffuser 5 is inserted in tube sheet 3, which, depending on the flow direction of the fluid, supplies or removes the fluid in flow channels 2. The inflow area of exhaust gas heat exchanger 1 is illustrated in the partial section shown in FIG. 1.

The exhaust gas flows into diffuser 5 and is distributed there among flow channels 2 and flows through heat exchanger 1 along them.

In order to prevent a direct striking of the inflowing exhaust gas on tube sheet 3, a shielding element 6 is integrated in addition in heat exchanger 1 shown in FIG. 1.

Shielding element 6 has a plurality of passages 7 and a plurality of spacing elements 8. It is inserted with passages 7 in flow channels 2 and sits with spacing elements 8 on tube sheet 3 of heat exchanger 1. It is important here according to the invention that passages 7 are designed such that they are not in direct contact with the inner surfaces of flow channels 2. Shielding element 6 furthermore has a laterally upstanding edge region 9 that reproduces the inner shape of diffuser 5 and thereby makes it possible to support shielding element 6 laterally on diffuser 5.

It is achieved by shielding element 6 that the hot, inflowing exhaust gases do not strike tube sheet 3 and flow channels 2 directly, but first strike shielding element 6, which because of its structural design is spaced apart from tube sheet 3 and flow channels 2.

An air space, which has an isolation effect with respect to the exhaust gas temperature, is formed between shielding element 6 and tube sheet 3, as well as flow channels 2, because of the spacing apart by spacing elements 8.

Passages 7 correspond in their outer contour to the inner contour of flow channels 2. The cross-sectional opening of passages 7, however, is configured smaller than the internal cross section of tubes 2, so that direct contact of the passages with the wall surfaces of flow channels 2 is prevented.

In the illustration shown in FIG. 1, shielding element 6, which preferably is made of a material that withstands the high temperatures of the exhaust gas flow, has a number of spacing elements corresponding to the spaces between flow channels 2. Thereby, shielding element 6 is supported on tube sheet 3 in the area between flow channels 2. Shielding element 6 is laterally supported in addition on the inner surfaces of diffuser 5.

In alternative embodiments, the design of spacing elements 8 and the number of spacing elements 8 can deviate from the embodiment shown here. Preferably, the smallest possible contact surface is to be created between shielding element 6 and tube sheet 3. In alternative embodiments, it is also conceivable to support shielding element 6 totally on diffuser 5, so that no additional support of shielding element 6 relative to the tube sheet is necessary. This would further increase the isolation effect of shielding element 6. This could be achieved, for example, by a circumferential groove on the inner surface of the diffuser into which the shielding element is inserted.

Figure 2:
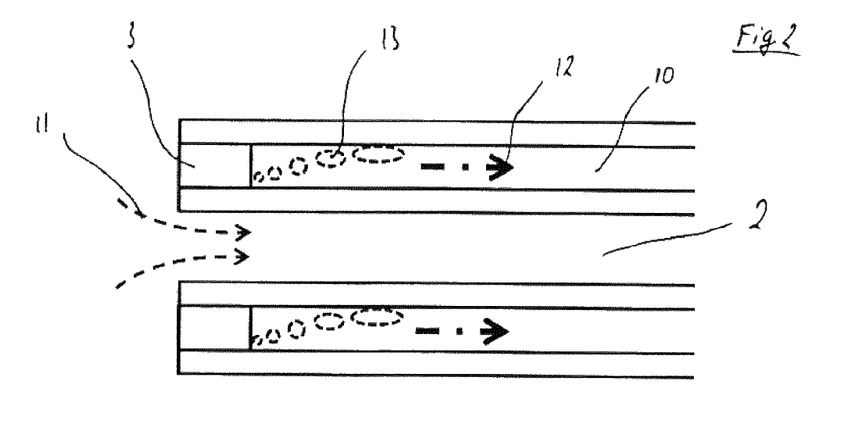
FIG. 2 shows a schematic illustration of a detail of an exhaust gas heat exchanger in which the coolant boils in the inlet area.

FIG. 2 shows a detailed view of a flow channel 2, through which the exhaust gas flows 11 and two flow channels 10, through which coolant flows 12. It is shown in FIG. 2 how areas in which the coolant begins to boil form within flow channels 10 of the coolant. These boiling areas 13 form primarily on the side of exhaust gas heat exchanger 1 that faces the inlet side of the exhaust gas.

Tube sheet 3 and the connected walls of flow channels 2 or 10 heat up by the striking of the hot exhaust gas on tube sheet 3. The temperature of the exhaust gas is thus transferred over the bridge of tube sheet 3 directly to the coolant, which flows in the interior of flow channels 10. If the temperature of the exhaust gas is correspondingly high enough and in addition there is a poor throughflow of flow channel 10, this can lead to the coolant beginning to boil.

The chemical property of the coolant can be changed by the boiling. Thus, for instance, silicates, which are dissolved in the coolant, are destroyed, which leads to a greater corrosive stress of the materials, particularly the aluminum materials of an exhaust gas heat exchanger 1.

Figure 3:
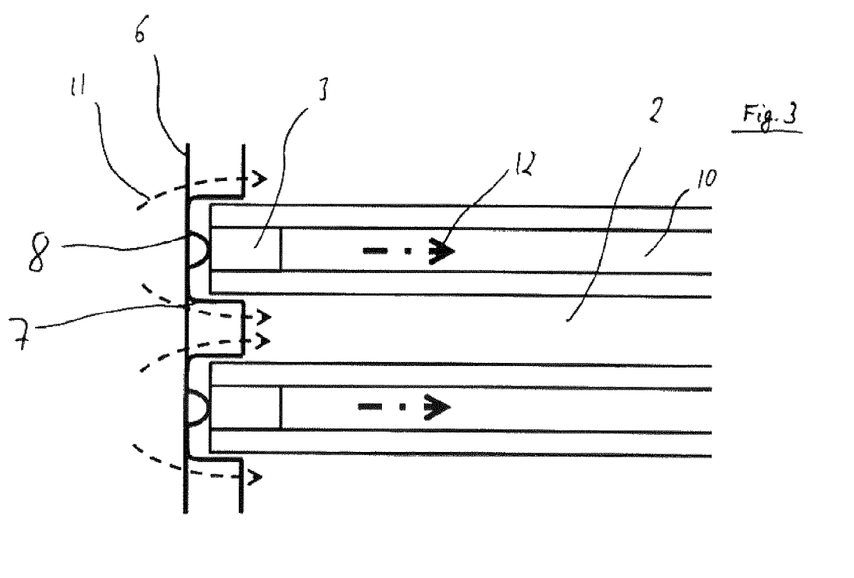
FIG. 3 shows a detailed view of the exhaust gas heat exchanger shown in FIG. 1, with an illustration of the gas flow and the coolant flow in the exhaust gas heat exchanger.

FIG. 3 shows an illustration that is similar to FIG. 2. Shielding element 6, analogous to the illustration in FIG. 1, which contributes to preventing or eliminating boiling regions within the coolant, is shown additionally in FIG. 3.

Shielding element 6, as already described in FIG. 1, is supported via spacing elements 8 on tube sheet 3. In addition, passages 7 project into flow channels 2 without touching these in so doing. An isolation effect arises due to the small contact surface of shielding element 6 to tube sheet 3 or to the walls of flow channels 2.

The high temperatures of the exhaust gas, which analogous to the arrow 11 in FIG. 2 flows through exhaust gas heat exchanger 1, thus no longer directly affect tube sheet 3 or the walls of flow channels 2 leading to a thermal relief for this part. As already noted in the description of FIG. 1, particularly the thermal decoupling of shielding element 6 from tube sheet 3 or the walls of flow channels 2 is of great importance.

The inlet side of exhaust gas heat exchanger 1 was described in FIGS. 1, 2, and 3.

Figure 4:
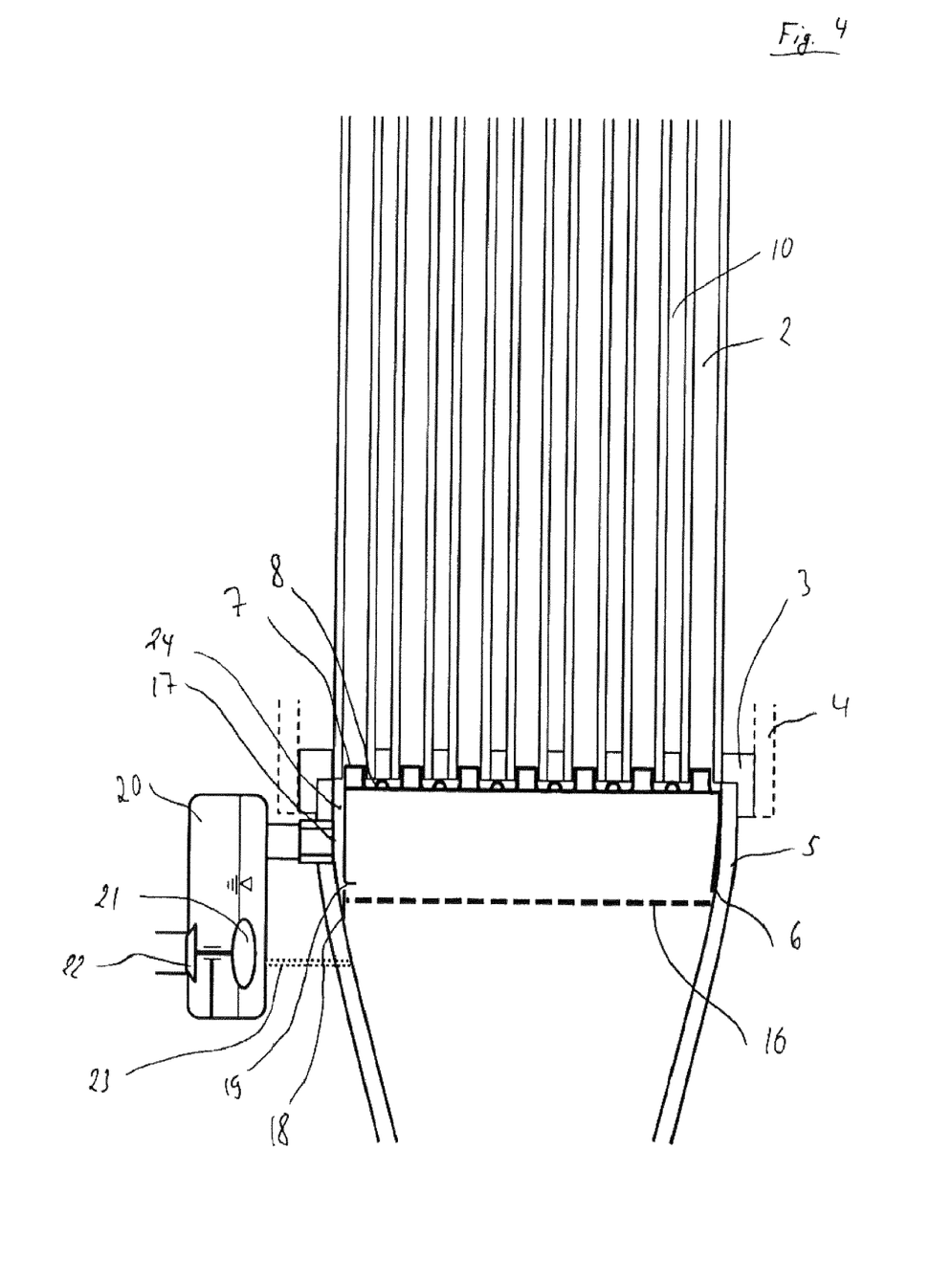
FIG. 4 shows a schematic illustration of a detail of an exhaust gas heat exchanger, in which the throughflowing exhaust gas condenses in the outlet area.

FIG. 4, in contrast, shows a sectional cut through an exhaust gas heat exchanger 1 and thereby in particular the outlet side, where the exhaust gas, flowing through the exhaust gas heat exchanger, exits flow channels 2 into diffuser 5 and ultimately leaves exhaust gas heat exchanger 1.

The employed reference characters correspond to those used in the previous figures. New elements are labeled by correspondingly new reference characters.

The structure of shielding element 6 on the outlet side is also largely identical to the structure of the inlet side in FIG. 1 or FIG. 3. As a departure from the design on the inlet side, shielding element 6 is now fixedly connected at least at one location 18 to diffuser 5.

Advantageously, this connecting site is arranged in the bottom area of exhaust gas heat exchanger 1. Shielding element 6 in this case is connected to the inner wall of diffuser 5 such that it is spaced apart from the inner wall of diffuser 5, especially in the diffuser area inserted in tube sheet 3. This makes it possible that the condensate, forming in the interior of flow channels 2 in the vicinity of the outlet region, can collect in hollow space 24, generated between shielding element 6 and the inner surface of diffuser 5.

The exhaust gas flowing through exhaust gas heat exchanger 1 is greatly cooled along flow channels 2 by the coolant flowing around flow channels 2. Because of this cooling, it can occur that the exhaust gas condenses particularly in the end region, facing the outlet side, of flow channels 2. Because these condensate droplets, should they flow unimpeded further into diffuser 5, could again enter the internal combustion engine via a possible exhaust gas recirculation, where they can cause corrosion and further damage, the outflow of the condensate out of exhaust gas heat exchanger 1 is to be avoided.

Shielding element 6 fulfills this function on the outlet side of exhaust gas heat exchanger 1. In contrast to the inlet side, where shielding element 6 is used as thermal isolation of tube sheet 3 and the wall of flow channels 2, shielding element 6 on the outlet side of exhaust gas heat exchanger 1 now functions as a separating element, which conveys the arising condensate out of exhaust gas heat exchanger 1.

The same as on the inlet side, passages 7 project into flow channels 2 and shielding element 6 is furthermore supported on the tube sheet via spacing elements 8 that are in contact with tube sheet 3. Likewise, passages 7 are spaced apart from the inner surfaces of flow channels 2.

The condensate forming especially on the inner walls of flow channels 2 can now run out of flow channels 2 through the gaps forming between passages 7 and the inner surfaces of flow channels 2. The condensate therefore collects on the side, facing flow channels 2, of shielding element 6 and accordingly runs downwards there.

Hollow space 24, which can take up condensate that collects and runs down on shielding element 6, forms by the spacing apart of the bottom upstanding edge region of shielding element 6 from the inner wall of diffuser 5. The condensate is thus effectively removed from the exhaust gas flow.

In order to remove still more condensate present in the exhaust gas, an additional water separator 16 is shown in FIG. 4. Said separator is arranged in the interior of diffuser 5 and is placed downstream of shielding element 6 in the direction of the exhaust gas flow.

Water separator 16 is substantially a perforated sheet. The condensate in the exhaust gas flow condenses on water separator 16 and then like the condensate occurring on shielding element 6, runs downward on water separator 16 and there, via an opening 19 provided in shielding element 6, also runs into hollow space 24 formed between shielding element 6 and the inner wall of diffuser 5.

Diffuser 5 has an opening 17, which is located in the outer wall of diffuser 5 in the area of hollow space 24. The condensate collected on water separator 16 and shielding element 6 can run out of exhaust gas heat exchanger 1 via this opening 17. A condensate collector 20, which is connected via a line to opening 17 of diffuser 5, is shown outside the exhaust gas heat exchanger.

The condensate collected on shielding element 6 and on water separator 16 flows into condensate collector 20. Condensate collector 20 shown in FIG. 4 has in its interior a float valve 21, which depending on the fill level of condensate collector 20 releases the condensate via a discharge opening 22.

Optionally, condensate collector 20 may have a ventilation opening that is in communication with diffuser 5 via a line 23. Over said opening, residual amounts of exhaust gas conveyed via opening 17 out of diffuser 5 into condensate collector 20, can again be conveyed back to diffuser 5.

The collecting unit, shown here outside diffuser 5, for the condensate can also be completely omitted in alternative embodiments of the exhaust gas heat exchanger, provided some other removal device for the condensate is provided. For example, it would be conceivable to return the condensate via a nozzle that atomizes the condensate extremely finely, back into diffuser 5, where it is then supplied again to the combustion process of the internal combustion engine within the scope of exhaust gas recirculation.

Figure 5:
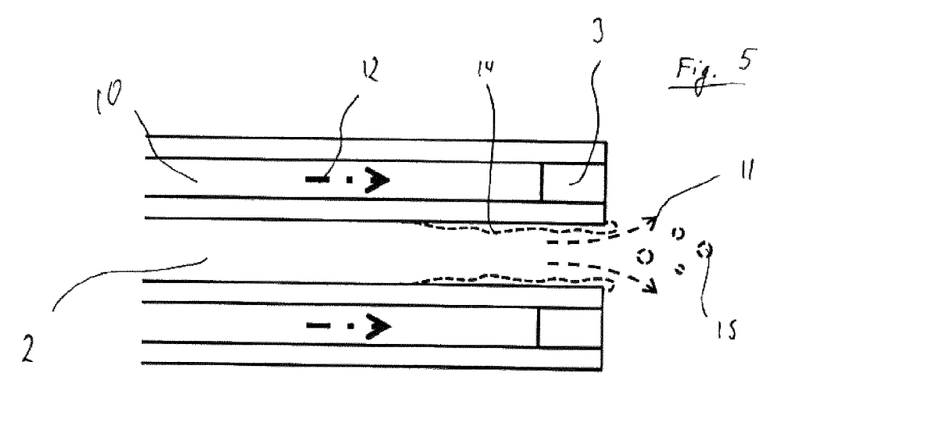
FIG. 5 shows a detailed view of the outlet area of an exhaust gas heat exchanger of the invention, with an illustration of the gas flow and the coolant flow in the exhaust gas heat exchanger.

FIG. 5 shows a detailed view similar to FIG. 2. In contrast to FIG. 2, the outlet side of the exhaust gas heat exchanger is now shown here.

It can be seen that in flow channel 2 conducting the exhaust gas, particularly in the end region, a condensation region 14 forms where liquid condensate condenses from the exhaust gas flow on the inner walls of flow channel 2. As a result, condensate droplets 15 can form that are taken along with the exhaust gas flow.

FIG. 6 also again shows the arrangement of FIG. 4 with the difference that shielding element 6 is now shown in addition here. As in the figures already described above, shielding element 6 is supported via spacing elements 8 on tube sheet 3 of exhaust gas heat exchanger 1. Passages 7 in FIG. 6 also project into flow channels 2 of the exhaust gas heat exchanger, without touching them, however.

Figure 6:
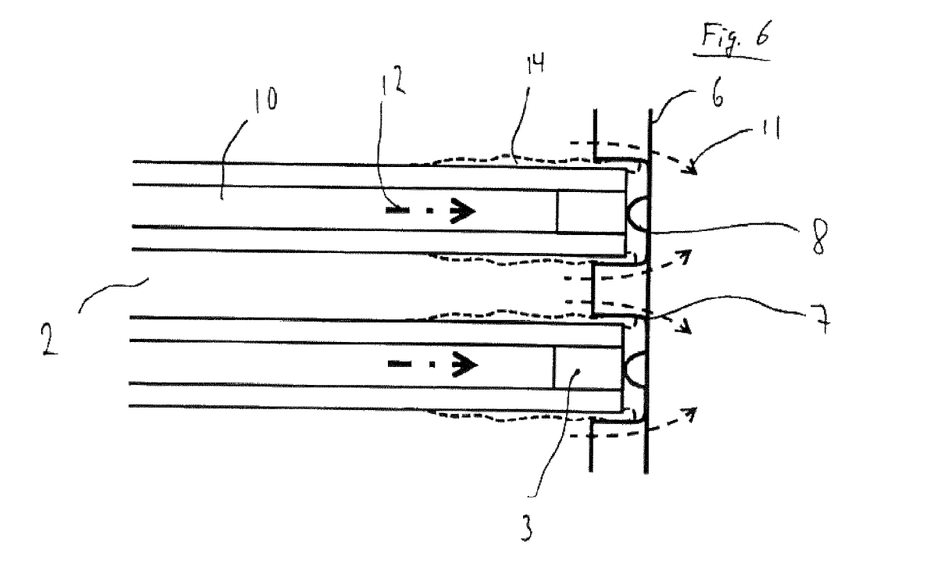
FIG. 6 shows a sectional cut through an exhaust gas heat exchanger of the invention, with an illustration of the outlet side of the exhaust gas heat exchanger with a discharge opening for the condensate forming in the outlet area.

Apart from condensation regions 14, exhaust gas flow 11 is also illustrated, which runs along flow channels 2 through shielding element 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust gas heat exchanger for use in a motor vehicle, the heat exchanger comprising:
    at least one first flow channel conducting a first fluid, a first end region of the first flow channel inserted in a first tube sheet and a second end region of the first flow channel inserted in a second tube sheet;
    a housing that surrounds the first flow channel, the housing having an inlet opening and an outlet opening and forms a second flow channel for a second fluid, wherein a second fluid is adapted to flow through the housing and wherein the second fluid is able to flow around the first flow channel, wherein the first and second tube sheets are inserted in the housing such that the first flow channel is sealed off from the second flow channel;
    a first diffuser that conducts the first fluid into the first flow channel;
    a second diffuser that conducts the first fluid out of the first flow channel;
    a first shielding element that has at least one passage and at least one spacing element,
    wherein the at least one spacing element abuts against the first tube sheet from a side facing away from the first flow channel,
    wherein a second shielding element is provided, the second shielding element having at least one passage and at least one spacing element and the second shielding element being fixedly connected to the second diffuser at least at one location, the one location forming a connecting site, and
    wherein the second shielding element has an at least partially upstanding edge region, the at least partially upstanding edge region having an opening, which is arranged between an inlet opening of the second diffuser and a water separator that is arranged in the second diffuser, the water separator being positioned downstream of the second shielding element in a flow direction of the first fluid.

2. The exhaust gas heat exchanger according to claim 1, wherein the at least one passage of the first shielding element projects into the first flow channel.

3. The exhaust gas heat exchanger according to claim 1, wherein an outer contour of the at least one passage of the first shielding element substantially coincides with an inner contour of the first flow channel.

4. The exhaust gas heat exchanger according to claim 1, wherein an outer cross section of the at least one passage of the first shielding element is smaller than an inner cross section of the first flow channel.

5. The exhaust gas heat exchanger according to claim 1, wherein an outer contour of the at least one passage of the first shielding element does not contact an inner contour of the first flow channel.

6. The exhaust gas heat exchanger according to claim 1, wherein the at least one spacing element of the first shielding element keeps apart portions of the first shielding element relative to the first tube sheet.

7. The exhaust gas heat exchanger according to claim 1, wherein the first shielding element has an at least partially circumferential upstanding edge region with which the first shielding element is supported on the first diffuser.

8. The exhaust gas heat exchanger according to claim 1, wherein the second diffuser has, in a side wall, an opening, which is arranged between the inlet opening, of the second diffuser and the connecting site of the second shielding element to the second diffuser.

9. The exhaust gas heat exchanger according to claim 1, wherein the heat exchanger has a plurality of first flow channels, wherein the first shielding element and the second shielding element each have a plurality of passages corresponding to the plurality of the first flow channels and the first shielding element and the second shielding element each have a plurality of spacing elements, wherein, in each case, a respective one of the first or second shielding elements is placed on one of the first or second tube sheets from a side facing away from the housing.

10. The exhaust gas heat exchanger according to claim 8, wherein a hollow space is provided between the at least partially upstanding edge region of the second shielding element and the side wall of the second diffuser having the opening.

* * * * *